United States Patent
Itabashi

(10) Patent No.: US 11,606,468 B2
(45) Date of Patent: Mar. 14, 2023

(54) IMAGE FORMING APPARATUS, IMAGE FORMING METHOD FOR PRINTING IMAGES IN AN ORDER DIFFERENT FROM AN ORDER OF READING IMAGES

(71) Applicant: Hanae Itabashi, Kanagawa (JP)

(72) Inventor: Hanae Itabashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/505,027

(22) Filed: Oct. 19, 2021

(65) Prior Publication Data
US 2022/0141342 A1    May 5, 2022

(30) Foreign Application Priority Data

Nov. 4, 2020  (JP) ............................. JP2020-184315

(51) Int. Cl.
 H04N 1/00      (2006.01)
 H04N 1/32      (2006.01)
(52) U.S. Cl.
 CPC ..... *H04N 1/00188* (2013.01); *H04N 1/00129* (2013.01); *H04N 1/32128* (2013.01)
(58) Field of Classification Search
 CPC ........... H04N 1/00188; H04N 1/00129; H04N 1/32128
 See application file for complete search history.

(56) References Cited

U.S. PATENT DOCUMENTS

| | | | | |
|---|---|---|---|---|
| 6,563,519 | B1* | 5/2003 | Minagawa | G06K 15/00 715/764 |
| 6,681,085 | B1* | 1/2004 | Collard | B41F 17/02 399/82 |
| 2004/0190061 | A1* | 9/2004 | Yamaguchi | H04N 1/00161 358/1.9 |
| 2005/0088709 | A1 | 4/2005 | Kizaki et al. | |
| 2006/0132821 | A1* | 6/2006 | Nonaka | H04N 1/00167 358/1.13 |
| 2007/0188834 | A1* | 8/2007 | Nakamura | H04N 1/32459 358/528 |
| 2019/0263623 | A1 | 8/2019 | Itabashi | |
| 2021/0006676 | A1* | 1/2021 | Nakabayashi | H04N 1/00167 |
| 2022/0212475 | A1* | 7/2022 | Yada | G03G 21/00 |

FOREIGN PATENT DOCUMENTS

| | | |
|---|---|---|
| JP | 2003-189027 | 7/2003 |
| JP | 2004-235769 | 8/2004 |

* cited by examiner

*Primary Examiner* — Iriana Cruz
(74) *Attorney, Agent, or Firm* — Harness, Dickey & Pierce, P.L.C.

(57) ABSTRACT

An image forming apparatus includes: a scanner to read a plurality of images of document into a plurality of pieces of image data each representing the image; a memory to store the plurality of pieces of image data in an order of image reading by the scanner; a printer to print, on one or more recording media sheets, the plurality of images according to the plurality of pieces of image data having been stored in the memory, in an order different from an order of image reading by the scanner; and circuitry to: in response to reading of a first image of the plurality of images of document into first image data representing the first image, calculate a remaining number of readable images using the first image data; and display information based on the remaining number of readable images.

13 Claims, 7 Drawing Sheets

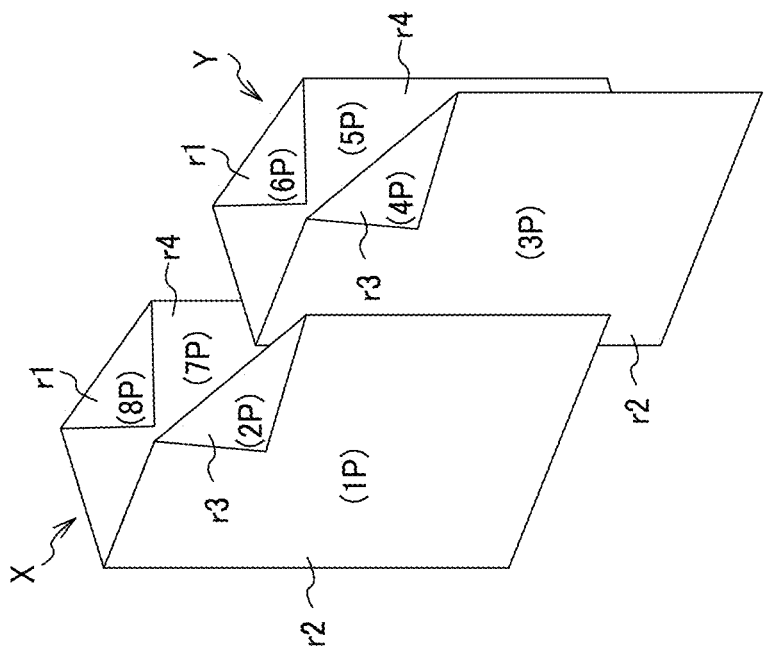
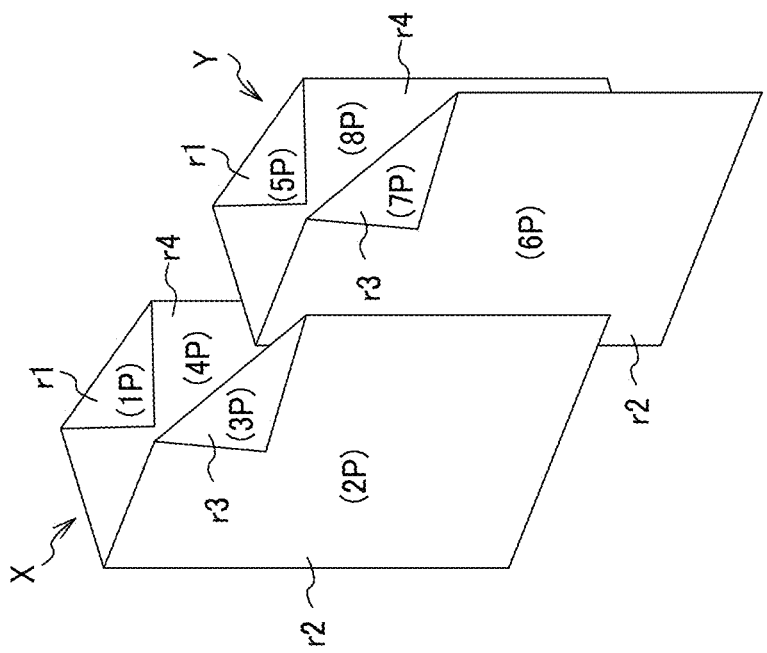

FIG. 5C1

FIG. 5C2 ically, the present disclosure is not# IMAGE FORMING APPARATUS, IMAGE FORMING METHOD FOR PRINTING IMAGES IN AN ORDER DIFFERENT FROM AN ORDER OF READING IMAGES

CROSS-REFERENCE TO RELATED APPLICATIONS

This patent application is based on and claims priority pursuant to 35 U.S.C. § 119(a) to Japanese Patent Application No. 2020-184315, filed on Nov. 4, 2020, in the Japan Patent Office, the entire disclosure of which is incorporated by reference herein.

BACKGROUND

Technical Field

Embodiments of the present disclosure relate to an image forming apparatus, an image forming method, and a non-transitory recording medium.

Related Art

There is known a technique of imposing and printing images in an order different from an order of reading images (for example, a bookbinding printing) by an image forming apparatus capable of reading the images on a document.

SUMMARY

Embodiments of the present disclosure provide an image forming apparatus, an image forming method, and a non-transitory recording medium storing program codes for forming an image.

In one aspect, the image forming apparatus includes: a scanner to read a plurality of images of document into a plurality of pieces of image data each representing the image; a memory to store the plurality of pieces of image data in an order of image reading by the scanner; a printer to print, on one or more recording media sheets, the plurality of images according to the plurality of pieces of image data having been stored in the memory, in an order different from an order of image reading by the scanner; and circuitry to: in response to reading of a first image of the plurality of images of document into first image data representing the first image, calculate a remaining number of readable images using the first image data; and display information based on the remaining number of readable images.

In one aspect, the image forming method includes: starting reading of a plurality of images of document into a plurality of pieces of image data each representing the image; starting storing of the plurality of pieces of image data in a memory in an order of image reading; in response to reading of a first image of the plurality of images of document into first image data representing the first image, calculating a remaining number of readable images using the first image data; displaying information based on the remaining number of readable images; determining whether to continue reading of the plurality of images of document; and printing, on one or more recording media sheets, the plurality of images according to the plurality of pieces of image data having been stored in the memory, in an order different from the order of image reading, based on a result of the determining.

In one aspect, a non-transitory recording medium is provided, which stores a plurality of program codes which, when executed by one or more processors, causes the processors to perform the above-described method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1C1 and 1C2 are schematic diagrams illustrating specific methods of printing according to the first embodiment:

FIG. 2 is a block diagram illustrating an example of a hardware configuration of the MFP according to the first embodiment;

FIG. 5C1 is a schematic view illustrating a specific example of a notification screen of the MFP according to the second embodiment;

FIG. 5C2 is a schematic view illustrating a specific example of a selection screen of the MFP according to the second embodiment.

Figure 1A:
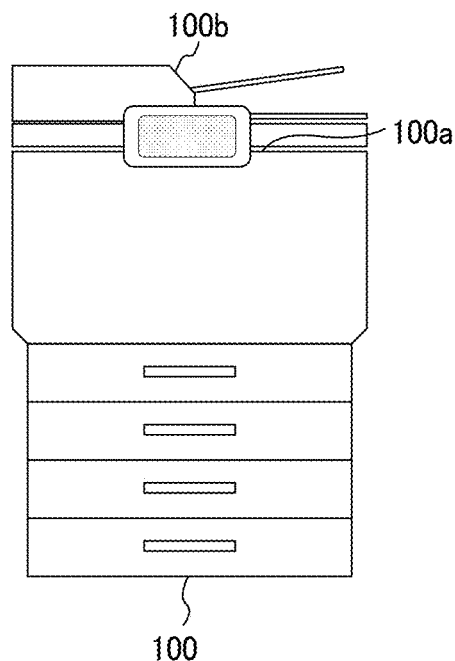
FIG. 1A is a schematic view illustrating a multifunction peripheral (MFP) as an example of an image forming apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Hereinafter, an image forming apparatus that is an example of an information processing apparatus according to an embodiment of the present disclosure is described with reference to the drawings.

In the drawings, the same reference numerals are given to the same components, and redundant explanation may be omitted.

First Embodiment

FIG. 1A is a schematic view illustrating an image forming apparatus according to one embodiment of the present disclosure. A multifunction peripheral (MFP) 100 is used as an example of the image forming apparatus according to the present embodiment. Note that the image forming apparatus is not limited to the multifunction peripheral (MFP) as long as the image forming apparatus includes a reading function and a printing function. The MFP 100 of the present embodiment can print an image on a transfer sheet (e.g., a paper sheet) in a plurality of types of printing methods such as bookbinding printing and the like.

As illustrated in FIG. 1A, the MFP 100 includes an exposure glass 100a and an auto document feeder (ADF) 100b. Upon receipt of an instruction of reading, the MFP 100 reads the image on a document placed on the exposure glass 100a. A user may place a book on the exposure glass 100a to cause the MFP 100 to read, for example, images (including a character string) of the book page by page.

Figure 1B:
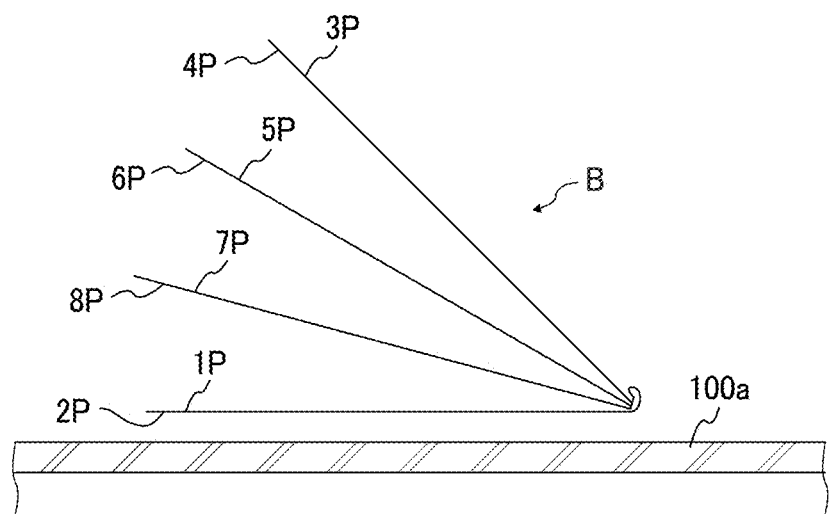
FIG. 1B is a schematic diagram illustrating a method for reading an image on each page of a book via an exposure glass of the MFP according to the first embodiment.

FIG. 1B is a schematic diagram illustrating a method for reading the image on each page of a book B via the exposure glass 100a. In the specific example of FIG. 1B, it is assumed that the image on each page of the eight-page book B is read. FIG. 1B illustrates a state in which the image on a second page of the book B, which is indicated as "2P" in FIG. 1B, is read. In this state, image data representing the image of the second page is stored in a memory (for example, a random access memory (RAM) 102b to be described below) in the MFP 100.

In the present embodiment, it is assumed that the images of pages are read in an order from the first page to the last page of the book. For example, in the specific example of FIG. 1B, the images of the first page to the eighth page are read in this order. Note that the method for reading the image of the document (for example, the book B in FIG. 1B) is not limited to the method of reading by placing the document on the exposure glass. If a shape of the document can be fed by the ADF 100b, for example, a document including paper sheets that are not bound, the ADF 100b may be used to feed the document one page by one page.

In a conventional technology, two pages of a double-page spread are placed on the exposure glass at a time for reading the image. In this case, one piece of image data that represents respective images of two pages is generated. Thereafter, in the conventional technology, from the one piece of image data representing the two pages, two pieces of image data each representing the image of one of the two pages are generated.

For example, it is assumed that the second page and the third page of the book B of the specific example of FIG. 1B are read at the same time in the configuration of the conventional technology described above. In this case, one piece of image data representing both the image of the second page and the image of the third page is generated. Thereafter, two pieces of image data respectively representing the image of the second page and the image of the third page are generated from the one piece of image data.

Figure 2:
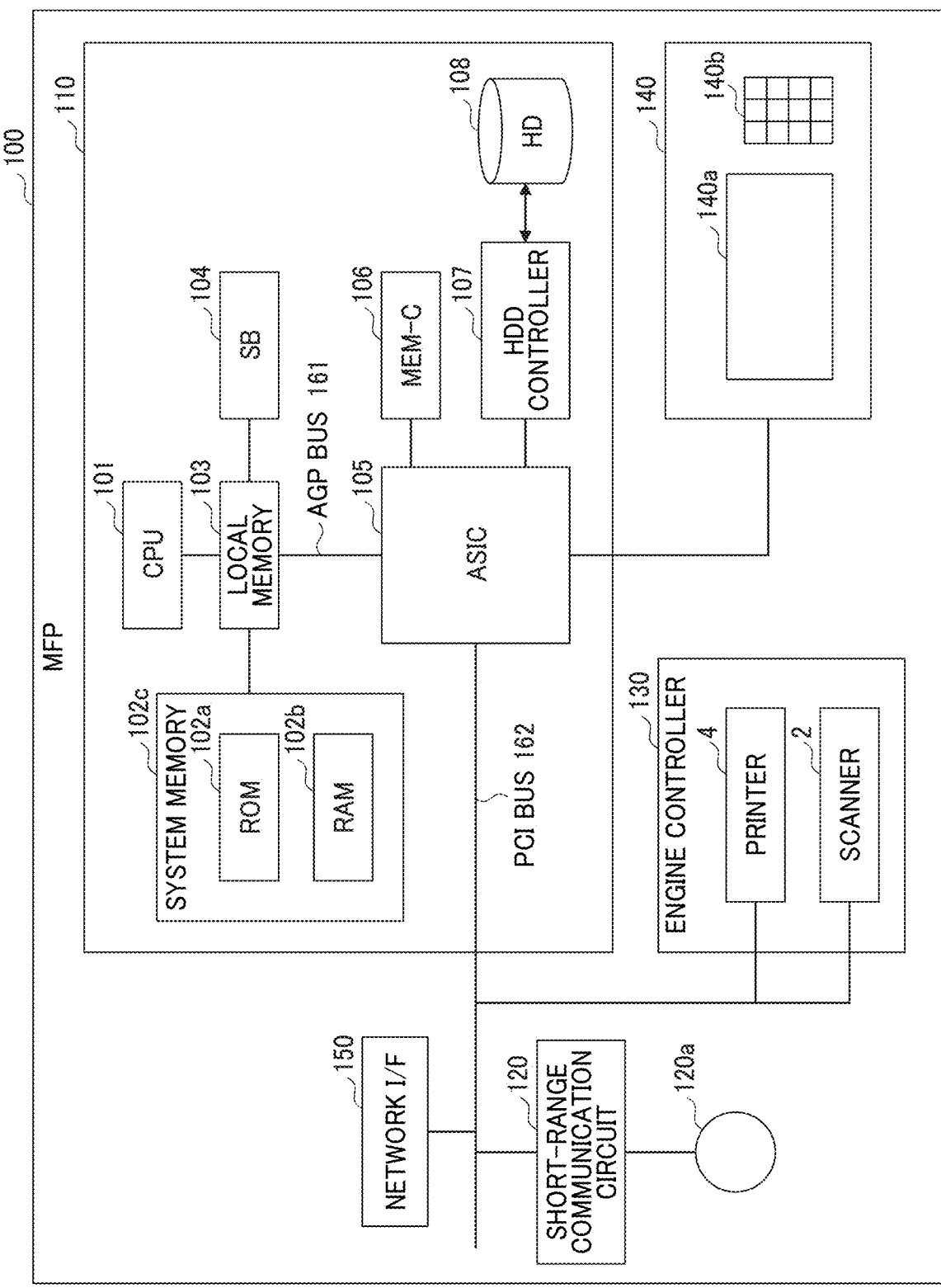

FIGS. 1C1 and 1C2 are schematic diagrams illustrating specific methods of printing according to the present embodiment. As illustrated in FIGS. 1C1 and 1C2, regions r1 to r4 are provided on the transfer sheets X and Y. The images are printed in the order from the region r1 to the region r4 of the transfer sheets. This printing order is common to methods for printing in the present embodiment. The regions r1 to r4 may be collectively referred to as the regions r.

The MFP 100 can perform normal printing and bookbinding printing of a plurality of read images on the transfer sheet (recording medium). In the normal printing, the read images are printed on the transfer sheets in an order of reading images (see FIG. 1C1). A detailed description is given later. On the other hand, in the bookbinding printing, the read images are printed on the transfer sheets in the order so as to form a book. In the bookbinding printing, the read images are printed on the transfer sheets in the order different from the order of reading images (see FIG. 1C2).

Note that, in the examples of FIGS. 1C1 and 1C2, it is assumed that the images of the first page to the eighth page of the book B are read in a similar manner to the example of FIG. 1B. In addition, in the examples of FIGS. 1C1 and 1C2, a character string "(1P)" is indicated in the corresponding region r in which the image of the first page of the book B is printed. Similarly, the character strings "(2P) to (8P)" are indicated in the corresponding regions r in which the images of the second page and subsequent pages are printed respectively.

FIG. 1C1 illustrates a specific example when the images are printed in normal printing. In the example of FIG. 1C1, it is assumed that eight images of the first page to the eighth page of the book B are printed. In the present embodiment, four images can be printed on one transfer sheet. Accordingly, in the example of FIG. 1C1, the images are printed on two transfer sheets X and Y. More specifically, the images of the first page to the fourth page of the book B are printed on the regions from r1 to r4 of the first transfer sheet X. Thereafter, the images of the fifth page to the eighth page of the book B are printed on the regions from r1 to r4 of the second transfer sheet Y. That is, in the normal printing, the images are printed in the order of reading images.

FIG. 1C2 illustrates a specific example when the images are printed in the bookbinding printing. In the example of FIG. 1C2, it is assumed that eight images of the first page to the eighth page of the book B are printed. In the example of FIG. 1C2 of the bookbinding printing, the images are printed on two transfer sheets X and Y in a similar manner to the example of FIG. 1C1 of the normal printing. However, the order of printing images differs between the bookbinding printing and the normal printing.

More specifically, in the bookbinding printing, the image of the first page of the book B is printed on the region r2 of the first transfer sheet X. Further, the image of the second page of the book B is printed on the region r3 of the first transfer sheet X, the image of the third page of the book B is printed on the region r2 of the second transfer sheet Y, and the image of the fourth page of the book B is printed on the region r3 of the second transfer sheet Y. Similarly, the image of the fifth page of the book B is printed on the region r4 of the second transfer sheet Y, the image of the sixth page of the book B is printed on the region r1 of the second transfer sheet Y, the image of the seventh page of the book B is printed on the region r4 of the first transfer sheet X, and the image of the eighth page of the book B is printed on the region r1 of the first transfer sheet X.

As described above, in a case of the bookbinding printing, the image read first (the image of the first page of the book B) and the image read last (the image of the eighth page of the book B) are printed on the same transfer sheet (X). In this method, all the images to be printed may be read before printing starts. In this case, image data of the image is stored each time the image is read, and printing is started after a plurality of image data is stored.

However, for example, when the number of images to be read is large (when the number of pages of a book is large), a total amount of the image data to be stored may exceed a data capacity storable in the storing unit (an insufficiency of memory capacity may occur in the middle of reading). In consideration of the above circumstances, the present embodiment employs a configuration that eliminates or reduces the inconvenience described above. Details of the configuration are to be described later.

FIG. 2 is a diagram illustrating a hardware configuration of the MFP 100 according to the present embodiment. As illustrated in FIG. 2, the MFP 100 includes a controller 110, a short-range communication circuit 120, an engine controller 130, an operation panel 140, and a network interface (I/F) 150.

The controller 110 includes a central processing unit (CPU) 101 as a main component of a computer, a system memory 102c, a north bridge (NB) 103, a south bridge (SB) 104, an application specific integrated circuit (ASIC) 105, a local memory 106, a hard disk drive (HDD) controller 107, and a hard drive (HD) 108 as a storage area (a memory). The NB 103 and the ASIC 105 are connected by an Accelerated Graphics Port (AGP) bus 161.

The CPU 101 is a processor that controls an entire operation of the MFP 100. The NB 103 is a bridge for connecting the CPU 101 to the system memory 102c, the SB 104, and the AGP bus 161, and includes a memory controller that controls reading and writing to the system memory 102c, a peripheral component interconnect (PCI) master, and an AGP target.

The system memory 102c includes a read only memory (ROM) 102a and the RAM 102b. The ROM 102a stores programs and data for implementing various functions of the controller 110. The RAM 102b is used to load the programs and the data. The RAM 102b is also used as a drawing memory to store drawing data for printing. For the purpose of the distribution, the programs stored in the ROM 102a may be stored in any computer-readable recording medium, such as a compact disc-read only memory (CD-ROM), compact disc-recordable (CD-R), or digital versatile disc (DVD), in a file format installable or executable by a computer.

The SB 104 is a bridge that connects the NB 103 to a PCI device and a peripheral device. The ASIC 105 is an integrated circuit (IC) having a hardware element for image formation and dedicated to an image processing use and serves as a bridge that connects the AGP bus 161, a PCI bus 162, the HDD controller 107, and the local memory 106 to each other.

The ASIC 105 includes a PCI target, an AGP master, an arbiter (ARB) as a central processor of the ASIC 105, a memory controller for controlling the local memory 106, a plurality of direct memory access controllers (DMACs) capable of converting coordinates of image data with a hardware logic, and a PCI unit that transfers data between a scanner 2 and a printer 4 through the PCI bus 162. A universal serial bus (USB) interface or an Institute of Electrical and Electronics Engineers (IEEE) 1394 interface may be connected to the ASIC 105.

The HD 108 is a storage area for storing image data, font data for printing, and forms. The HDD controller 107 controls reading and writing of various data from and to the HD 108 under control of the CPU 101.

The local memory 106 is a local memory used as a copy image buffer and a code buffer. The AGP bus 161 is a bus interface for a graphics accelerator card, which has been proposed to accelerate graphics processing. Through directly accessing the system memory 102c by high-throughput, speed of the graphics accelerator card is improved.

The short-range communication circuit 120 includes an antenna 120a. The short-range communication circuit 120 is a communication circuit in compliance with the near field communication (NFC), BLUETOOTH or the like. The engine controller 130 includes the scanner 2 and the printer 4. The operation panel 140 includes a panel display 140a and an input unit 140b. The panel display 140a is, for example, a touch panel that displays current settings or a selection screen and receives a user input. The input unit 140b includes, for example, a numeric keypad and a start key. The numeric keypad receives assigned values of image forming parameters such as an image density parameter. The start key receives an instruction to start copying.

The controller 110 controls the entire operation of the MFP 100. For example, the controller 110 controls drawing, communication, and user inputs to the operation panel 140. The scanner 2 and the printer 4 have a capability of image processing such as error diffusion and gamma conversion.

In response to an instruction to select a specific application through the operation panel 140 by use of, for example, an application switch key, the MFP 100 selectively performs document server function, copying function, printing function, and facsimile communication function. When the document server function is selected, an operation mode switches to a document box mode. With selection of the copying function, the operation mode switches to a copy mode. With selection of the printing function, the operation mode switches to a printer mode. With selection of the facsimile communication function, the operation mode switches to a facsimile mode.

The network I/F 150 is an interface for data communication through a communication network. The short-range communication circuit 120 and the network I/F 150 are electrically connected to the ASIC 105 through the PCI bus 162.

Figure 3:
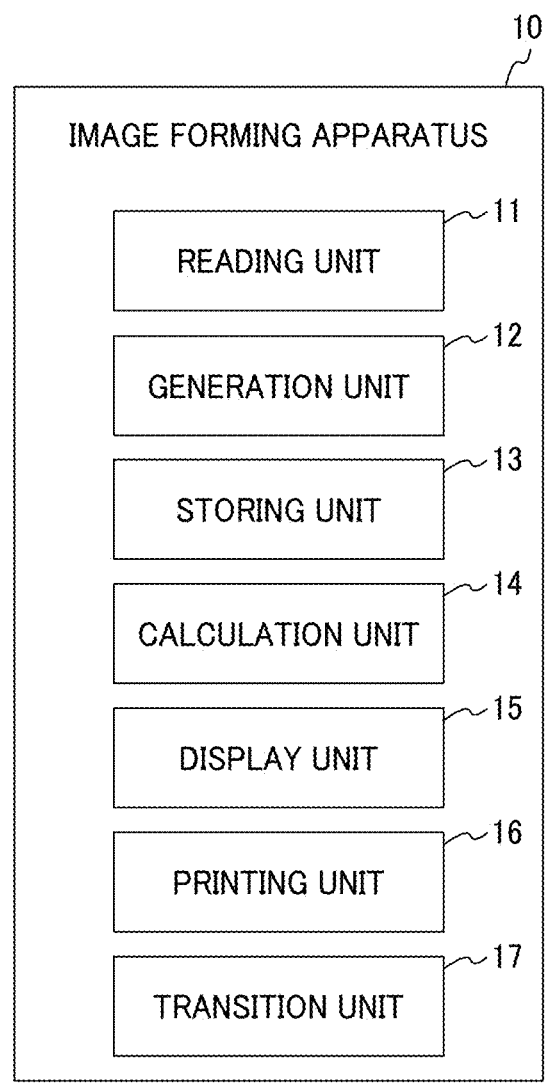
FIG. 3 is a block diagram illustrating an example of a functional configuration of the MFP according to the first embodiment.

FIG. 3 is a block diagram illustrating an example of a functional configuration of an image forming apparatus 10 according to the present embodiment. For example, the MFP 100 serves as the image forming apparatus 10 by the CPU 101 executing a program. As illustrated in FIG. 3, the image forming apparatus 10 according to the present embodiment includes a reading unit 11, a generation unit 12, a storing unit 13, a calculation unit 14, a display unit 15, a printing unit 16, and a transition unit 17. Each function unit is implemented by the CPU 101 executing a program and controlling a related hardware illustrated in FIG. 2.

The reading unit 11 reads an image on a document. The reading unit 11 is implemented by the scanner 2 and the CPU 101 controlling the scanner 2. Specifically, in the case of the bookbinding printing, the images of respective pages are read in the order from the first page to the last page of the book. The generation unit 12, implemented by the CPU 101, generates the image data representing each image read by the reading unit 11. The storing unit 13 is implemented by the CPU 101, the HDD controller 107 controlled by the CPU 101, and the HD 108 to which the HDD controller 107 writes the image data. The storing unit 13 sequentially stores the image data of the images each time the image is read. Specifically, in the case of the bookbinding printing, before printing starts, the plurality of pieces of image data representing the images of the first page to the last page of the book is stored in the order of reading images in the storing unit 13.

Here, it is assumed that the number of pages (total pages) of the book is large. In this case, the total amount of the plurality of pieces of image data each representing the image of respective page of the book may exceed the data capacity of the storing unit 13. Accordingly, while the images of the book are being read (in the middle of reading), reading the images of the book may be discontinued. In consideration of the above circumstances, the image forming apparatus 10 of the present embodiment includes the calculation unit 14 and the display unit 15 in order to eliminate or reduce the inconvenience described above.

After a first image is read, the calculation unit 14 implemented by the CPU 101 calculates a remaining number of readable images (hereinafter referred to as "remaining number N") using the image data representing the first image, which is generated by the generation unit 12. The remaining number N represents, in the unit of one image, the remaining memory capacity for image reading. That is, the calculation unit 14 calculates (estimates) the remaining number N before each image of the second page and subsequent pages is read. Note that, in the present embodiment, the image on one page is read as one image. In other words, the remaining number N is a remaining number of readable pages.

Specifically, when the bookbinding printing is selected, the calculation unit 14 acquires a current remaining data capacity (hereinafter referred to as "remaining data capacity C0") that the storing unit 13 can store before the first image is read. In addition, after the first image is read and the image data representing the first image is stored in the storing unit 13, the calculation unit 14 acquires a remaining data capacity (hereinafter referred to as "remaining data capacity C1") that the storing unit 13 can store.

The calculation unit 14 calculates an amount of memory that the storing unit 13 uses for storing the image data representing the first image (hereinafter referred to as "reference data amount cs") by subtracting the remaining data capacity C1 from the remaining data capacity C0 (cs=C0−C1). In the present embodiment, when the bookbinding printing is performed, the image data of each image are generated under the same conditions (color printing or monochrome printing, data format, and the like). In the calculation method described above, the amount of the image data of each image is likely to be substantially the same amount. Therefore, the amount of memory used to store each image data of the images of the second page and subsequent pages is likely to be substantially the same amount to the reference data amount cs.

In consideration of the above circumstances, the calculation unit 14 divides the remaining data capacity C1 by the reference data amount cs and stores the calculation result as the remaining number N. Note that the method for calculating the remaining number N is not limited to the above example. For example, when the number of "m (m≥2)" images are read, first the memory amount used to store each image data of the "m" images may be calculated, and then the remaining number N can be calculated from the first calculation result. In the calculation method described above, the reference data amount cs can be obtained by dividing the first calculation result by the numerical value "m."

The display unit 15, implemented by the CPU 101 and the operation panel 140, displays information based on the remaining number N calculated by the calculation unit 14 on the panel display 140a. Specifically, immediately after the image on the first page is read (before each image of the second page and subsequent pages is read), the display unit 15 displays the remaining number N as the remaining number of readable pages. Note that the remaining number N itself may not be displayed. For example, a numerical value smaller than the remaining number N (e.g., a numerical value "N−1") may be displayed as the remaining number of readable pages. In the calculation method described above, even if data other than the image data are stored in the storing unit 13 after the remaining number of readable pages is displayed, an inconvenience that reading the images is discontinued before completing of reading the remaining pages can be eliminated or reduced.

In addition, it is assumed that post-processing (staple processing or the like) is performed to the transfer sheet on which each image is printed. In this case, there may be an upper limit on the number of transfer sheets to which the post-processing can be performed at one time (hereinafter referred to as an "upper limit number of sheets"). In consideration of the above circumstances, when the number of the images that can be printed on the upper limit number of sheets is smaller than the remaining number N calculated by the calculation unit 14, the number of the images that can be printed on the upper limit number of sheets may be displayed as the number of images (the number of pages) that can be printed.

After a plurality of pieces of image data are stored, the printing unit 16 (implemented by the CPU 101 and the printer 4) prints the images on the transfer sheet (an example of a recording medium) in the order different from the order of the images read by the reading unit 11. Specifically, the CPU 101 changes the order of printing in response to a printing mode selected on the operation panel 140 and the printing unit 16 prints images read by the reading unit 11 on the transfer sheets in the order so as to form a book. That is, the printing unit 16 can perform the bookbinding printing described above.

The transition unit 17 implemented by the CPU 101 makes a transition of a printing mode between (e.g., a first printing mode and a second printing mode) in which print settings (color printing or monochrome printing, data format, printing method, presence or absence of post-processing, and the like.) are different. In the first printing mode and the second printing mode described above, even when a same image is read, the number of pieces of image data that can be stored in the storing unit 13 is different. That is, in the first printing mode and the second printing mode, even w % ben the same image is read, the remaining number N is different. The user can set a desired printing mode in advance by appropriately operating the operation panel 140 before performing image reading.

It is assumed that the printing mode for reading the first image is different from the printing mode for reading the second image and subsequent images as a comparative example. In the comparative example, the remaining number N calculated by the calculation unit 14 is less likely to match the remaining number of images that can be actually read. In consideration of the above circumstances, in the present embodiment, the first image for determining the reference data amount cs is read in the printing mode for reading the other images (second image and subsequent images). The calculation method described above has an advantage that the remaining number N is easily calculated more accurately compared to, for example, the calculation method of the comparative example described above.

Figure 4:
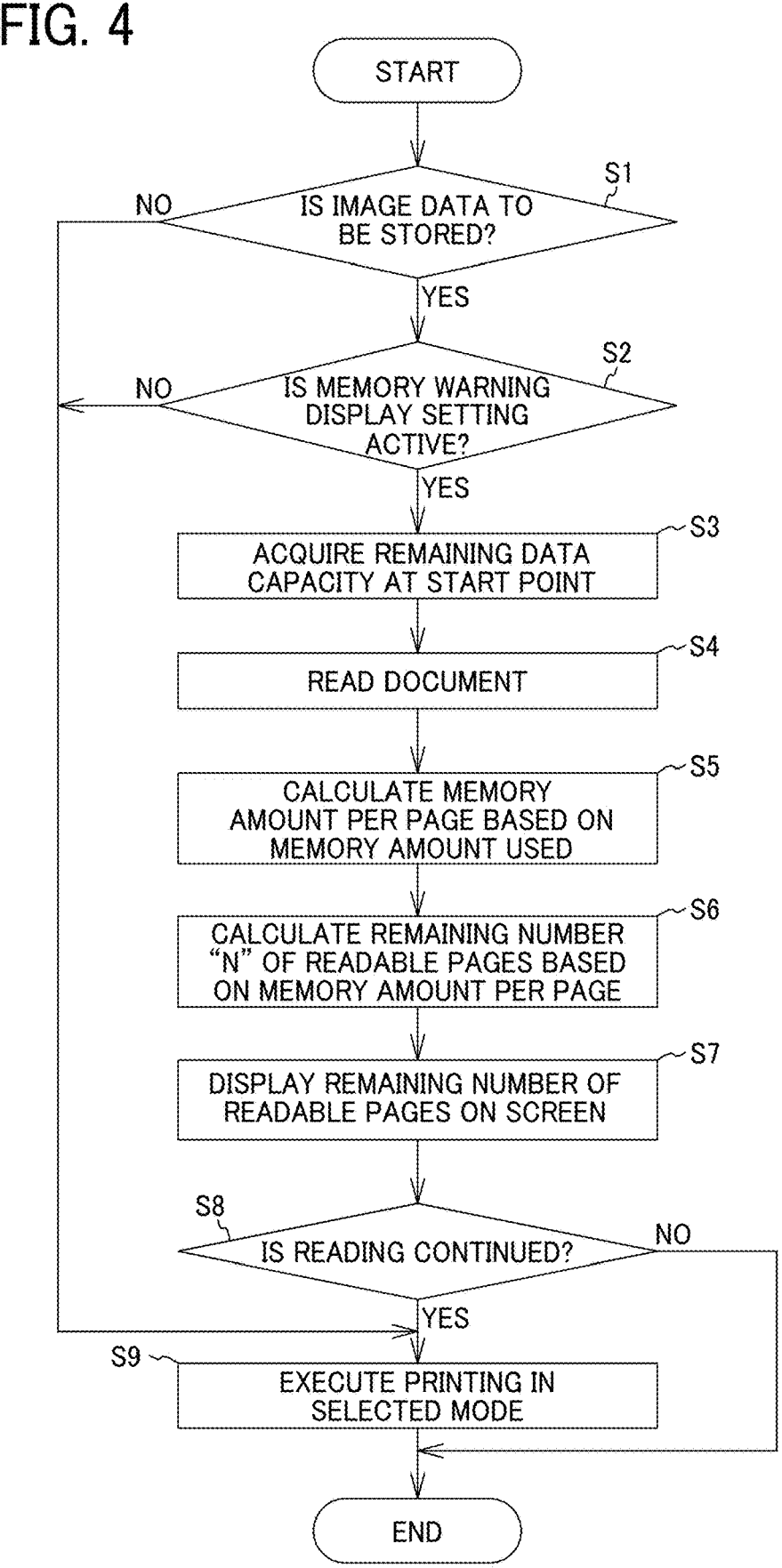
FIG. 4 is a flowchart illustrating an example of a printing process according to the first embodiment.

FIG. 4 is a flowchart illustrating an example of a printing process according to the present embodiment. The image forming apparatus 10 (in particular, for example, the CPU 101) executes processing for printing when, for example, a printing method is selected by the user, for example, on the operation panel 140.

When the processing for printing is started, it is determined whether or not the printing mode selected this time involves storing the image data in the storing unit 13 (S1). For example, when the bookbinding printing is selected as the printing mode, it is determined that the printing mode involves storing the image data (Yes in S1). On the other hand, when the normal printing is selected as the printing mode, it is determined that the printing mode does not involve storing the image (No in S1). When the printing mode that does not involve storing the image data in the storing unit 13 is selected (No in S1), the image forming apparatus prints the image in the selected printing mode (S9) and ends the processing for printing.

When the printing mode that involves storing the image data in the storing unit 13 is selected (Yes in S1), the image forming apparatus 10 determines whether or not a memory waning display setting is active (S2). In the present embodiment, during a period in which the memory warning display setting is active, the remaining number of readable pages is displayed as a memory waning in accordance with the remaining number N calculated by the calculation unit 14 (the processing of S7 is executed, which will be described later). On the other hand, during the period in which the memory warning display setting is not active, the memory waning is not displayed. Note that a specific example of a configuration for setting whether or not to activate the memory warning display setting will be described in a second embodiment described later (see FIGS. 5A, 5B, 5C1, and 5C2).

When the memory warning display setting is not active (No in S2), the image forming apparatus 10 advances the processing to S9 described above. On the other hand, when the memory warning display setting is active (Yes in S2), the image forming apparatus 10 acquires the above-described remaining data capacity C0 (a remaining data capacity at a start point) (S3). When the first image is read (S4), the image forming apparatus 10 generates the image data representing the first image, and the storing unit 13 stores the image data. After storing the first image data, the image forming apparatus 10 acquires the above-described remaining data capacity C1.

The image forming apparatus 10 calculates the above-described reference data amount cs (memory usage amount per page) using the remaining data capacity C0 acquired in S3 and the remaining data capacity C1 (S5). Specifically, the image forming apparatus 10 stores a result obtained by subtracting the remaining data capacity C1 from the remaining data capacity C0 as the reference data amount cs. The image forming apparatus 10 calculates the remaining number N using the reference data amount cs calculated in S5 and the remaining data capacity C1 (S6). Specifically, the image forming apparatus 10 stores a result obtained by dividing the remaining data capacity C1 by the reference data amount cs as the remaining number N. Note that when the result of division is not an integer, a decimal point may be rounded down.

After calculating the remaining number N, the image forming apparatus 10 displays the remaining number of readable pages (S7). Specifically, the image forming apparatus 10 displays the above-described memory warning. The memory warning includes the remaining number of readable pages. In addition, the image forming apparatus 10 receives an operation of either continuing printing (reading) or cancelling printing during the period in which the memory warning is displayed. The operation of continuing printing is, for example, the operation of reading the images of the second page and subsequent pages. On the other hand, the operation of cancelling printing is, for example, a cancel operation on the operation panel 140.

When the number of pages planned to be read is larger than the remaining number of readable pages displayed on the display unit 15, the user can determine to cancel printing. On the other hand, when the number of pages planned to be read is equal to or smaller than the remaining number of readable pages displayed on the display unit 15, the user can determine to continue printing. According to the above-described processes, an occurrence of the insufficiency of memory capacity in the storing unit 13 before completing to read all the images (in the middle of reading) is eliminated or reduced.

After displaying the memory warning, the image forming apparatus 10 determines whether the operation of continuing reading or the operation of cancelling reading is received (S8). When the image forming apparatus 10 determines that the operation of cancelling reading is received (No in S8), the image forming apparatus 10 omits the step S9 and ends the processing for printing. Note that, when the operation of cancelling reading is received, the image data representing the first image, which have already been stored in the storing unit 13, may be erased. On the other hand, when the image forming apparatus 10 determines that the operation of continuing reading (the operation of reading the remaining pages) is received (Yes in S8), the image forming apparatus 10 continues reading the remaining pages, executes printing in the selected printing mode (S9), and ends the processing for printing.

Second Embodiment

Another embodiment of the present disclosure is described below. Note that, in the embodiment described below, elements having the same function as the elements described in the first embodiment is denoted by the reference numeral used in the description of the first embodiment, and detailed description thereof is appropriately omitted.

Figure 5A:
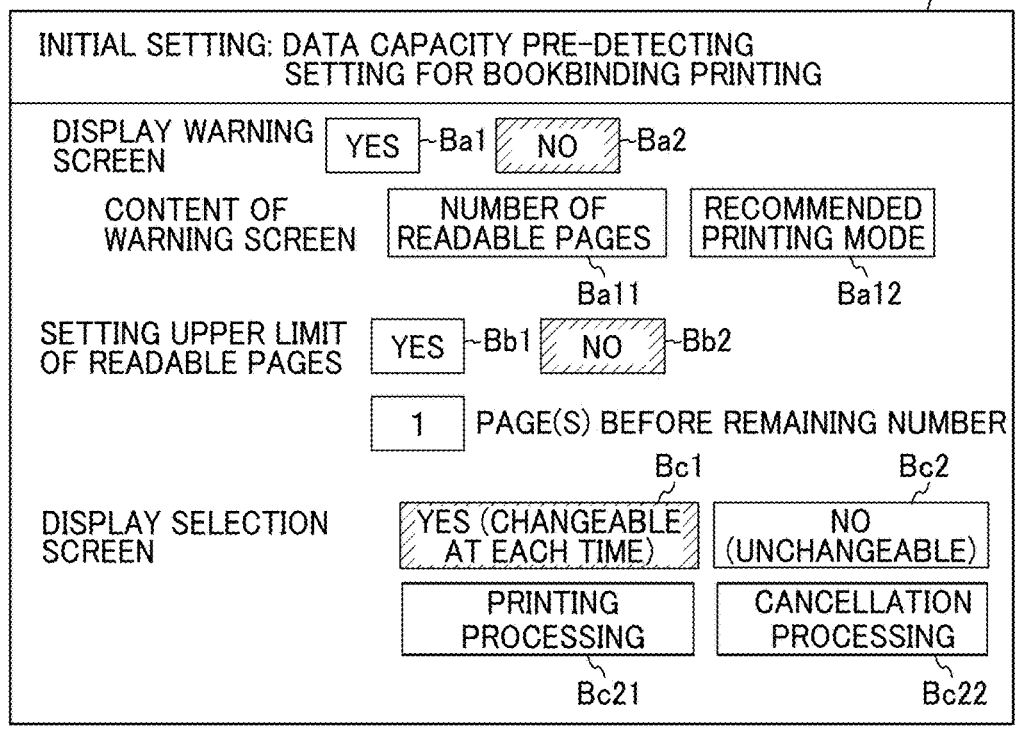
FIG. 5A is a schematic view illustrating a specific example of an initial setting screen of a multifunction peripheral (MFP) according to a second embodiment of the present disclosure.

FIG. 5A is a schematic view illustrating an example of an initial setting screen Ga according to a second embodiment of the present disclosure. The initial setting screen Ga is displayed, for example, on the panel display 140a. FIG. 6 is a block diagram illustrating an example of a functional configuration of the image forming apparatus 10 according to the second embodiment. As illustrated in FIG. 6, the image forming apparatus 10 of the second embodiment includes a control unit 18 and a change unit 19 (both implemented by the CPU 101) in addition to the components (see FIG. 3) of the first embodiment. During a period in which the initial setting screen Ga is displayed, when a user performs a setting operation (a touch operation of a button image in FIG. 5B, which is to be described later), the control unit 18 and the change unit 19 function.

Before a total number of images already read by the reading unit 11 (hereinafter referred to as a "read number n") reaches the remaining number N, the control unit 18 notifies the user of discontinuation of image reading. Specifically, when the read number n reaches a notification number X (e.g., a numerical value "N−1" or an "upper limit number of sheets") that is smaller than the remaining number N, the control unit 18 causes the display unit 15 to display another notification screen Gc (see FIG. 5C1 to be described later). The notification screen Gc is an image for preventing continuation of the image reading operation. The configuration of the second embodiment has an advantage that the image reading operation can be stopped before a total amount of the image data already read exceeds a data amount storable in the storing unit 13.

The change unit 19 can change a printing mode after the display unit 15 displays the remaining number N in a display form according to the remaining number N. Specifically, after a warning screen Gb (see FIG. 5B to be described later) is displayed on the display unit 15, the change unit 19 can change the printing mode. The warning screen Gb displays the remaining number N that is an example of a warning message.

As described above, the amount of the image data is variable depending on the printing mode, and the remaining number N that can be stored in the storing unit 13 may differ. It is assumed that the remaining number N displayed on the display unit 15 is smaller than the number of images planned to be read. In this case, all the images planned to be read may be completely read when the user changes the current printing mode to another printing mode that allows the remaining number N to become larger than the remaining number N of the current printing mode.

As illustrated in FIG. 5A, the initial setting screen Ga includes a button image Ba1, a button image Ba2, a button image Ba11, and a button image Ba12. The user can set whether or not to display the warning screen Gb by performing a touch operation on either the button image Ba1 or the button image Ba2. Specifically, when one of the button image Ba1 and the button image Ba2 is operated, the operated button image Ba (either Ba1 or Ba2) becomes a selected state and the other becomes anon-selected state. When the button image Ba1 is set to the selected state, the warning screen Gb is displayed after a first image is read. On the other hand, when the button image Ba2 is set to the selected state, the warning screen Gb is not displayed.

The button image Ba11 and the button image Ba12 are operated to set (change) a display content of the warning screen Gb. Specifically, the button image Ba11 and the button image Ba12 can be operated during the period in which the button image Ba1 is in the selected state (the period in which the warning screen Gb is being displayed). The button image Ba11 is switched between a selected state and a non-selected state each time the button image Ba11 is operated. When the button image Ba11 is in the selected state, the remaining number N is displayed on the warning screen Gb. When the button image Ba11 is in the non-selected state, the remaining number N is not displayed on the warning screen Gb.

The button image Ba12 is switched between a selected state and a non-selected state each time the button image Ba12 is operated. When the button image Ba12 is in the selected state, a recommended printing mode is displayed on the warning screen Gb. When the button image Ba12 is in the non-selected state, the recommended printing mode is not displayed on the warning screen Gb. Specifically, the image forming apparatus 10 of the second embodiment determines the recommended printing mode from a plurality of printing modes based on the reference data amount cs corresponding to the image that has been read first. For example, the image forming apparatus 10 determines the recommended printing mode that allows the remaining number N to become the largest among the plurality of the printing modes. Note that a criterion for determining the recommended printing mode may be changed as appropriate.

Figure 5B:
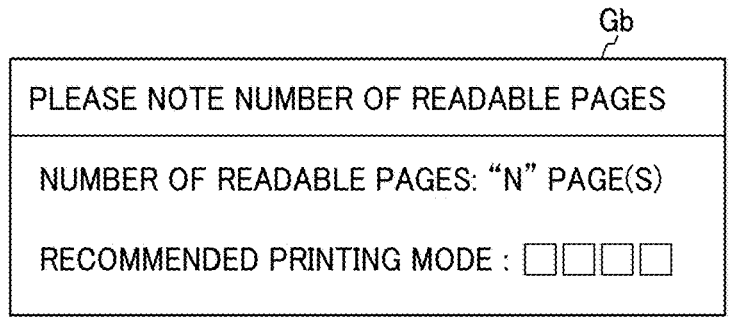
FIG. 5B is a schematic view illustrating a specific example of a warning screen of the MFP according to the second embodiment.
Figure 5B:
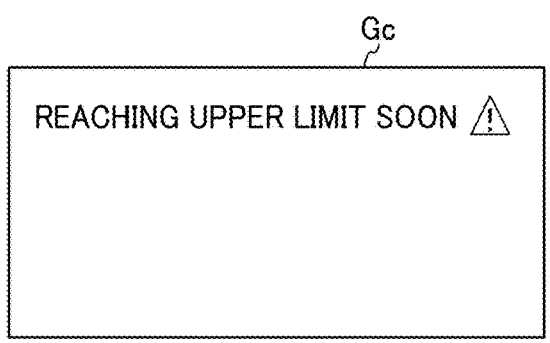
Figure 5B:
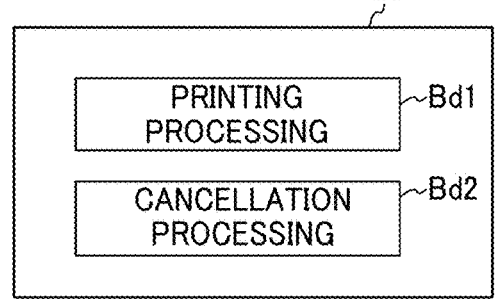
Figure 6:
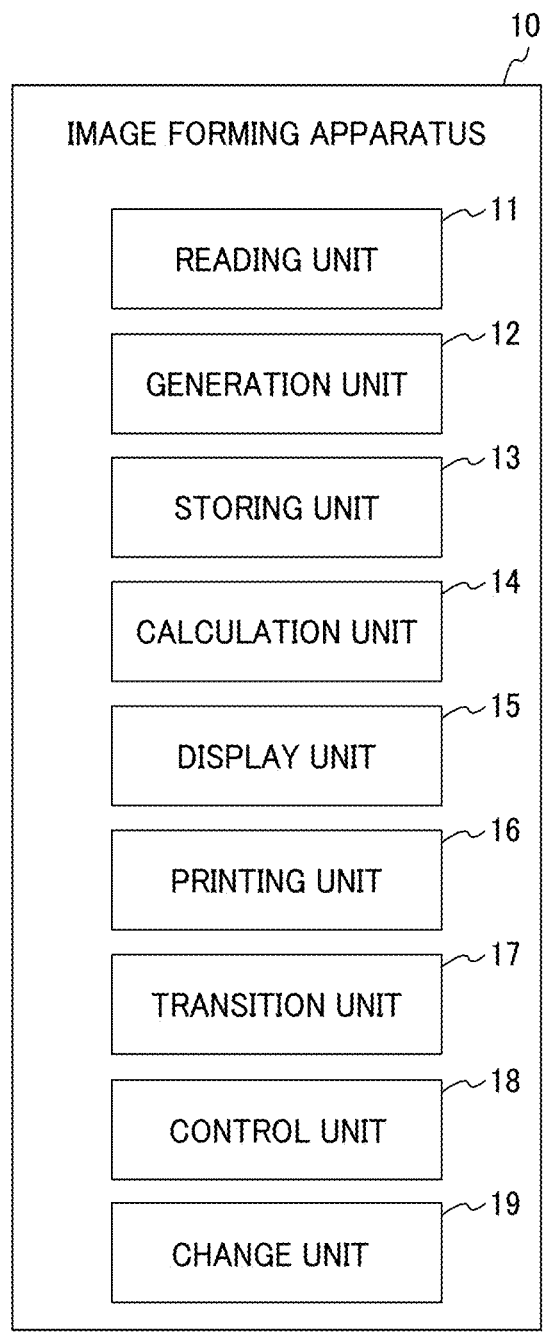
FIG. 6 is a block diagram illustrating an example of a functional configuration of an image forming apparatus according to the second embodiment.

FIG. 5B is a schematic view illustrating a specific example of the warning screen Gb according to the second embodiment. In the example of FIG. 5B, it is assumed that both the remaining number N and the recommended printing mode are displayed (both Ba11 and Ba12 are in the selected state). As illustrated in FIG. 5B, the remaining number N is displayed as the remaining number of readable pages on the warning screen Gb. In addition, the recommended printing mode (recommended printing settings such as color printing or monochrome printing, data format, printing method, presence or absence of post-processing, and the like.) is displayed on the warning screen Gb. The user can consider whether or not to continue printing, change the number of pages to be printed, and change the printing mode in accordance with the remaining number N and the recommended printing mode on the warning screen Gb.

In the second embodiment, the printing mode can be changed after the warning screen Gb is displayed. Furthermore, when the printing mode is changed after the warning screen Gb is displayed, the image forming apparatus 10 newly calculates the remaining number N according to a new printing mode changed from the current printing mode. Specifically, when the printing mode is changed, an instruction to read again the first image is displayed. The image forming apparatus 10 newly calculates the remaining number N using the image data representing the first image that has been read for the new printing mode after the change of the printing mode.

The image forming apparatus 10 changes the remaining number of readable pages displayed on the warning screen Gb according to the remaining number N newly calculated. Note that, if the first image data that has already been read can be converted into the image data that is to be generated for the new printing mode after the change of the printing mode, the first image data may be used for newly calculating the remaining number N. In this case, the remaining number N is calculated using the amount of the image data after the conversion.

Referring back to FIG. 5A, the initial setting screen Ga further includes a button image Bb1 and a button image Bb2. The user can set whether or not to display the notification screen Gc by performing the touch operation on either the button image Bb1 or the button image Bb2. Specifically, when one of the button image Bb1 and the button image Bb2 is operated, the operated button image Bb (either Bb1 or Bb2) becomes a selected state and the other becomes a non-selected state.

When the button image Bb1 is set to the selected state, the notification screen Gc is displayed. As described above, the notification screen Gc is displayed when the read number n reaches the notification number X. On the other hand, when the button image Bb2 is set to the selected state, the notification screen Gc is not displayed. Note that, in the second embodiment, the user can freely set the notification number X. Specifically, during the period in which the initial setting screen Ga is displayed, the user can input a desired number of pages that is to be reduced from the remaining number N on the operation panel 140 (numeric keypad) to set the notification number X. In the specific example of FIG. 5A, it is assumed that "1" is input as the desired number of pages to set the notification number X. Alternatively, another configuration that does not allow the user to set the notification number X may be employed.

FIG. 5C1 is a schematic view illustrating a specific example of the notification screen according to the second embodiment. As illustrated in FIG. 5C1, the notification screen Gc displays a message indicating that the read number n reaches the remaining number N soon. In the second embodiment, the notification screen Gc is displayed for a predetermined time period. The predetermined time period is, for example, defined by the user or a manufacturer. Note that the time period in which the notification screen Gc is being displayed may be changed as appropriate. In addition, the display content of the notification screen Gc may be changed as appropriate. For example, the number of images up to the remaining number N (N−X) may be displayed on the notification screen Gc.

When the notification screen Gc is displayed, the user may end the image reading operation by printing the images that have already been read or the user may cancel the printing itself. The image forming apparatus 10 according to the second embodiment, can automatically execute processing for printing the images that have already been read (hereinafter referred to as "printing processing") or processing for cancelling printing (hereinafter referred to as "cancellation processing") when the notification screen Gc is displayed. The above configuration is described below in detail. However, another configuration may be employed in which, when the prevention screen Gc is displayed, the image reading operation is continued until the read number n reaches the remaining number N.

The description returns to FIG. 5A. The initial setting screen Ga further includes a button image Bc1, a button image Bc2, a button image Bc21, and a button image Bc22. By performing the touch operation on either the button image Bc1 or the button image Bc2, the user can set whether or not to automatically execute either of the printing processing or the cancellation processing after the notification screen Gc is displayed. Further, when the automatic execution is set to the selected state, either of the printing processing or the cancellation processing can be set by the button image Bc21 and the button image Bc22.

Specifically, when one of the button image Bc1 and the button image Bc2 is operated, the operated button image Bc (either Bc1 or Bc2) becomes a selected state and the other becomes a non-selected state. When the button image Bc1 is set to the selected state, either of the printing processing or the cancellation processing is automatically executed after the notification screen Gc is displayed. On the other hand, when the button image Bc2 is set to the selected state, neither of the printing processing or the cancellation processing is automatically executed. Specifically, when the button image Bc2 is set to the selected state, a selection screen Gd (see FIG. 5C2 to be described later) is displayed after the notification screen Gc is displayed. The user can select either of the printing processing or the cancellation processing to be executed using the selection screen Gd.

FIG. 5C2 is a schematic view illustrating a specific example of the selection screen Gd according to the second embodiment. As illustrated in FIG. 5C2, the selection screen Gd includes a button image Bd1 and a button image Bd2. When the button image Bd1 is operated, the printing processing is executed and the images that have already been read are printed. When the button image Bd2 is operated, the cancellation processing is executed, the image data of the images that have already been read are erased, and printing is canceled. In the second embodiment, the same effect as in the first embodiment described above is obtained.

The embodiments described above are examples, and aspects of the present disclosure provide effects and advantages as described below.

First Aspect

According to a first aspect, an image forming apparatus (10) includes a reading unit (11) that reads an image on a document, a generation unit (12) that generates image data representing the image read by the reading unit, a storing unit (13) that sequentially stores the image data each time the image is read, a calculation unit (14) that calculates a remaining number (N) of readable images using the image data generated by the generation unit in response to reading a first image on the document, a display unit (15) that performs display in a display form according to the remaining number, and a printing unit (16) that prints the image on a recording medium in an order different from an order of the images read by the reading unit (see FIG. 1C2) after a plurality of pieces of the image data are stored in the storing unit. In the configuration described above, since the display unit performs the display in the display form according to the remaining number, for example, the image forming apparatus may prompt a user to reduce the number of documents or cancel printing. Thus, an occurrence of an insufficiency of memory capacity in the storing unit is eliminated or reduced.

Second Aspect

According to a second aspect, the image forming apparatus of the first aspect further includes a control unit (18) that notifies the user of discontinuation of reading the image (a display of a notification screen Gc) before the total number of images that have already been read by the reading unit reaches the remaining number (when a read number n reaches a notification number X). According to the present aspect, an effect of preventing the occurrence of the insufficiency of memory capacity in the storing unit is particularly remarkable.

Third Aspect

According to a third aspect, the image forming apparatus of the second aspect further includes a transition unit (17) that makes a transition of a printing mode between a first printing mode and a second printing mode in which the remaining number is different even when a same image is read, and a change unit (19) that changes the printing mode after the display unit displays the remaining number in the display form according to the remaining number. According to the present aspect, the effect of preventing the occurrence of the insufficiency of memory capacity in the storing unit is particularly remarkable.

Fourth Aspect

According to a fourth aspect, an image forming method includes reading an image on a document, generating image data representing the read image, sequentially storing the image data each time the image is read, calculating a remaining number of readable images using the image data generated in response to reading a first image on the document, performing display in the display form according to the remaining number, and printing the image on a recording medium in an order different from an order of reading images. According to the present aspect, the same effect as in the first aspect is obtained.

Fifth Aspect

A program according to a fifth aspect causes a computer to execute each step in the image forming method of the fourth aspect. According to the present aspect, the same effect as in the first aspect is obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising:
   a scanner configured to read a plurality of images of document into a plurality of pieces of image data each representing the image;
   a memory configured to store the plurality of pieces of image data in an order of image reading by the scanner;
   a printer configured to print, on one or more recording media sheets, the plurality of images according to the plurality of pieces of image data having been stored in the memory, in an order different from an order of image reading by the scanner; and
   circuitry configured to:
      in response to reading of a first image of the plurality of images of document into first image data representing the first image, calculate a remaining number of readable images using the first image data;
      display the remaining number of readable images on a display panel;
      in response to reading of each subsequent image of the plurality of images of document into subsequent image data representing the subsequent image, calculate an updated remaining number of readable images using the first image data and all subsequent image data; and
      display the updated remaining number of readable images on a display panel.

2. The image forming apparatus according to claim 1, wherein the circuitry outputs a notification indicating discontinuation of image reading based on a determination that a total number of one or more of the plurality of images that have been read by the scanner is about to reach the remaining number of readable images.

3. The image forming apparatus according to claim 1, wherein the circuitry:
   makes a transition of a printing mode between a first printing mode and a second printing mode in which the remaining number of readable images calculated using the first image data differs; and
   changes the printing mode in response to the display of the remaining number of readable images.

4. An image forming method comprising:
   starting reading of a plurality of images of document into a plurality of pieces of image data each representing the image;
   starting storing of the plurality of pieces of image data in a memory in an order of image reading;
   in response to reading of a first image of the plurality of images of document into first image data representing the first image, calculating a remaining number of readable images using the first image data;
   displaying the remaining number of readable images on a display panel;
   determining whether to continue reading of the plurality of images of document;
   in response to reading of each subsequent image of the plurality of images of document into subsequent image data representing the subsequent image, calculate an updated remaining number of readable images using the first image data and all subsequent image data; and
   display the updated remaining number of readable images on a display panel; and
   printing, on one or more recording media sheets, the plurality of images according to the plurality of pieces of image data having been stored in the memory, in an order different from the order of image reading, based on a result of the determining.

5. A non-transitory recording medium storing a plurality of program codes which, when executed by one or more processors, causes the processors to perform a method, the method comprising:
   starting reading of a plurality of images of document into a plurality of pieces of image data each representing the image;
   starting storing of the plurality of pieces of image data in a memory in an order of image reading;
   in response to reading of a first image of the plurality of images of document into first image data representing the first image, calculating a remaining number of readable images using the first image data;
   displaying the remaining number of readable images on a display panel;
   determining whether to continue reading of the plurality of images of document;
   in response to reading of each subsequent image of the plurality of images of document into subsequent image data representing the subsequent image, calculate an updated remaining number of readable images using the first image data and all subsequent image data; and
   display the updated remaining number of readable images on a display panel; and
   printing, on one or more recording media sheets, the plurality of images according to the plurality of pieces of image data having been stored in the memory, in an order different from the order of image reading, based on a result of the determining.

6. The image forming apparatus according to claim 1, wherein the image forming apparatus is a multifunctional peripheral.

7. The image forming apparatus according to claim 1, wherein the remaining number of readable images is calculated based upon a data amount of the first image data.

8. The image forming apparatus according to claim 1, wherein the remaining number of readable images is calculated by dividing a remaining data capacity of the memory by a data amount of the first image data.

9. The image forming apparatus according to claim 4, wherein the image forming apparatus is a multifunctional peripheral.

10. The image forming apparatus according to claim 4, wherein the remaining number of readable images is calculated based upon a data amount of the first image data.

11. The image forming apparatus according to claim 4, wherein the remaining number of readable images is calculated by dividing a remaining data capacity of the memory by a data amount of the first image data.

12. The method according to claim 5, wherein the remaining number of readable images is calculated based upon a data amount of the first image data.

13. The image forming apparatus according to claim 5, wherein the remaining number of readable images is calculated by dividing a remaining data capacity of the memory by a data amount of the first image data.

* * * * *